United States Patent Office 3,309,377
Patented Mar. 14, 1967

3,309,377
3-[(2-OXAZOLIDINONE-3-YL)-ALKYL]-4-THIAZOL-
IDINONES AND THEIR PREPARATION
Alexander R. Surrey, Albany, N.Y., assignor to Sterling
Drug Inc., New York, N.Y., a corporation of Delaware
No Drawing. Filed Oct. 19, 1964, Ser. No. 404,927
15 Claims. (Cl. 260—301)

This invention relates to compositions of matter classified in the art of chemistry as substituted 4-thiazolidinones and to processes for making such compositions The invention sought to be patented, in its composition aspect, is described as residing in the concept of a chemical compound having a molecular structure in which the 4-thiazolidinone radical is connected, by its ring-nitrogen atom, through a polycarbon-(lower-alkylene) radical having its connecting linkages on different carbon atoms, to the ring-nitrogen atom of the 2-oxazolidinone radical.

The invention sought to be patented in its process for making aspect is described as residing in the concept of reacting a 3-[(β-hydroxy-lower-alkylamino)-(polycarbon-lower-alkyl)]-4-thiazolidinone with an ester of trichloroacetic acid or a trichloroacetyl halide to form a 3-[(2-oxazolidinone-3-yl) - (polycarbon-lower-alkyl)]-4-thiazolidinone.

The tangible embodiments of the composition aspect of the invention possess the inherent general physical properties of being white or cream-colored crystalline solids melting between about 80° C. to about 250° C.; are substantially insoluble in water; and, are recrystallizable from polar solvents, e.g., ethanol, isopropyl alcohol, acetonitrile, ethyl acetate, etc. Examination of compounds produced according to the hereinafter described process reveals, upon infrared spectographic analysis, spectral data confirming the molecular structure hereinbefore set forth. For example, the C=O frequency characteristic for each cyclized nucleus is evident. The aforementioned physical characteristics, taken together with the nature of the starting materials, the mode of synthesis, and the correspondence of calculated and found values for the elementary analyses, positively confirm the structure of the compositions sought to be patented.

The tangible embodiments of the invention possess the inherent applied use characteristics of exerting varying pharmacological effects in animal organisms, as evidenced by known pharmacological evaluation procedures.

As used herein, the term "polycarbon-lower-alkylene" means alkylene radicals having from two to six carbon atoms and having its connecting linkages on different carbon atoms, including the straight and branched-chain radicals, among which are, for purpose of illustration but without limiting the generality of the foregoing,

—CH$_2$CH$_2$—, —CH(CH$_3$)CH$_2$—, —CH$_2$CHCH$_3$, —C(CH$_3$)$_2$CH$_2$—

—CH$_2$CH$_2$CH$_2$—, —CH$_2$CHCH$_2$CH$_3$, —CH$_2$CH$_2$CH$_2$CH$_2$—

—CH$_2$CH$_2$CHCH$_3$, —CH$_2$CHCH$_2$CH$_2$CH$_3$, —CH$_2$CHCH$_2$CH$_2$CH$_2$CH$_3$ and

—CH$_2$CH$_2$CH$_2$CH$_2$CH$_2$CH$_2$—

The term "lower-alkyl," as used herein, means alkyl radicals having from one to six carbon atoms, including the straight and branched-chain radicals, among which are, for purpose of illustration but without limiting the generality of the foregoing, methyl, ethyl, n-propyl, isopropyl, n-butyl, 2 - butyl, isobutyl, n-amyl, isoamyl, n-hexyl, 3-hexyl, and the like.

The term "β - hydroxy - lower - alkylamino," as used herein, means hydroxyalkylamino radicals having from two to six carbon atoms and having the hydroxy and amino attached to adjacent carbon atoms of the alkyl moiety, including the straight and branched-chain radicals, among which are, for purposes of illustration but without limiting the generality of the foregoing, β-hydroxyethylamino, β - hydroxypropylamino, β - hydroxybutylamino, β - hydroxyhexylamino, β - hydroxy-α,β-dimethylethylamino, β - hydroxy-α,β,β-trimethylethylamino, and the like.

The manner and process of making and using the invention will now be generally described so as to enable a person skilled in the art of chemistry to make and use the same, as follows:

The 3 - [(β-hydroxy-lower-alkylamino) - (polycarbon-lower-alkyl)]-4-thiazolidinone starting material can be prepared according to the following known general procedure, which involves heating a mixture of an aldehyde, e.g., formaldehyde (I) [preferably as paraformaldehyde] or benzaldehyde, a β-hydroxy-lower-alkylamino-(polycarbon-lower-alkyl)amine, e.g., 2-(2-hydroxyethylamino) ethylamine (II) and an α-mercaptoalkanoic acid, e.g., thioglycolic acid (IV). This reaction probably takes place in three steps and is illustrated as follows:

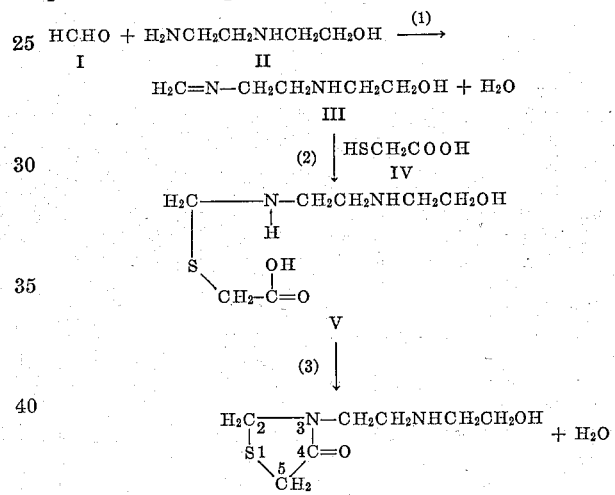

Thus, in step (1) the aldehyde (I) is condensed with the amine (II) to yield an azomethine (III) plus water. In the second step (2) the thioglycolic acid (IV) adds to the carbon-nitrogen double bond of the azomethine (III) to yield the aminomethylmercaptoacetic acid derivative (V) which cyclizes in the third step (3) to yield the desired intermediate (VI) plus a second molecule of water. The process is usually carried out without isolating the intermediate azomethine (III) or the aminomethylmercaptoacetic acid derivative (V). Since two molar equivalents of water (one in each of steps 1 and 3) are formed for every mole of thiazolidinone (VI) produced, the extent of condensation (in step 1) and cyclization (in step 3) can be followed and the reaction time ascertained by carrying out the procedure in an inert, non-polar solvent such as benzene and collecting the water in a continuous separator connected to the apparatus. The procedure is carried out preferably in refluxing benzene until no more water is collected.

The above procedure, while being the preferred method of preparing the 3-[(β-hydroxy-lower-alkylamino)-(polycarbon-lower-alkyl)]-4-thiazolidinone starting material can be modified, but with no particular advantage. For example, the preparation can be run at lower temperatures down to about room temperature but the reaction time required is longer; or it can be carried out without a solvent or using other solvents such as toluene, ethanol, isopropanol, n-hexane, and the like.

Other compounds are the full equivalents of the 3-[2-(2 - hydroxyethylamino)ethyl] - 4 - thiazolidinone (VI) above as starting materials and are either known compounds or can be prepared in a manner similar to that above described for preparing the 3-[2-(2-hydroxyethylamino)-ethyl]-4-thiazolidinone. For example, the formaldehyde (or paraformaldehyde) can be replaced in the above procedure by lower-alkyl-aldehydes, phenyl-aldehydes, pyridyl-aldehydes, thienyl-aldehydes and naphthyl-aldehydes, thereby yielding a starting material (like VI) having a 2-substituent, e.g., 4-chlorophenyl using 4-chlorobenzaldehyde; the 2-(2-hydroxyethylamino)ethylamine can be replaced by other β-hydroxy-lower-alkyl-amino-(polycarbon-lower-alkyl)amines; and, the thioglycolic acid can be replaced by other α-mercaptoalkanoic acids, thereby producing a starting material (like VI) having a lower-alkyl substituent at position 5 of the thiazolidinone ring. Each of these starting materials is useful for conducting the reaction with an ester of trichloroacetic acid or trichloroacetyl halide.

According to one procedure, the physical embodiments of my concept are made by reacting an above-described 3 - [(β-hydroxy - lower - alkylamino) - (lower - alkyl)]-4-thiazolidinone starting material with a lower-alkyl trichloroacetate, preferably the methyl or ethyl ester because of its ease of preparation and ready availability, and because of the ease of removal of the methanol or ethanol formed in the reaction. Other lower-alkyl trichloroacetates are satisfactory for the purpose. The reaction is run at room temperature or, preferably, by heating at temperatures up to about 100° C. in the presence or absence of a solvent, preferably the latter. The reaction is conveniently run by heating the reactants on a steam bath for about three to five hours. If the reaction is run at room temperature, it is run for a longer period, from several days to about two weeks, and preferably with stirring. The proportion of the reactants may be in equimolar quantities, but, preferably an excess of the lower-alkyl trichloroacetate is used.

Other alternative methods of producing the desired 3-[(2 - oxazolidinone - 3 - yl) - (lower - alkyl)] - 4 - thiazolidinone embodiments can be employed. For example, other trichloroacetate esters can be used, e.g., the phenyl ester; the nature of the alcohol moiety can be varied since it is eliminated during the reaction. A less preferred procedure involves treating the 3-[(β-hydroxy-lower - alkylamino) - (lower - alkyl)] - 4 - thiazolidinone in an inert solvent, e.g., ethylene dichloride, with a trichloroacetyl halide, preferably the chloride, at a low temperature, e.g., below 5° C., in the presence of an equivalent quantity of an acid-acceptor, e.g., sodium hydroxide, to remove the hydrogen halide formed by the reaction.

1-oxide and 1,1-dioxide physical embodiments of my concept are prepared by oxidizing the above 3-[(2-oxazolidinone - 3 - yl) - (polycarbon - lower - alkyl)] - 4-thiazolidinone using appropriate oxidizing agents.

The 1-oxide embodiment is prepared by reacting the thiazolidinone with an oxidizing agent effective to oxidize sulfides to sulfoxides. Various oxidative procedures can be employed, but the one preferred comprises using a per-organic acid, e.g., peracetic acid, in a suitable solvent, e.g., ethyl acetate. The reaction is exothermic and is carried out preferably by mixing the reactants preferably at a low temperature, i.e., from 0° C. to 10° C. Other oxidizing agents that can be used are other per-organic acids, e.g., perbenzoic acid.

The 1,1-dioxide embodiment is prepared by reacting the thiazolidinone with an oxidizing agent effective to oxidize sulfides to sulfones. Various oxidative procedures can be employed, but the one preferred comprises using potassium permanganate in aqueous acetic acid solution. Other oxidizing agents that can be used include hydrogen peroxide, chromium trioxide ($CrO_3$), and the like. Also, the oxidation can be carried out using an excess of a per-organic acid, e.g., peracetic acid, at about room temperature (20–25° C.) for several days. Alternatively, 1,1-dioxides can be prepared by oxidizing the corresponding 1-oxides using these same oxidizing agents effective to oxidize sulfides to sulfones, e.g., potassium permanganate, hydrogen peroxide, etc.

The best mode contemplated by the inventor of carrying out his invention will now be set forth as follows:

EXAMPLE 2-(2-chlorophenyl)-3-[2-(2-oxazolidinone-3-yl)-ethyl]-4-thiazolidinone, -1-oxide and -1,1-dioxide

A. Preparation of starting material

Reflux a solution containing 14 g. of 2-chlorobenzaldehyde, 10.4 g. of 2-(2-hydroxyethylamino)ethylamine, 9.5 g. of thioglycolic acid and 100 ml. of benzene for eighteen hours with a continuous separator connected to the reaction vessel for removal of water formed by the reaction. Cool the reaction mixture and pour it into dilute aqueous ammonium hydroxide solution. Separate the benzene layer, wash it with water, dry it over anhydrous calcium sulfate, and evaporate it to remove the benzene. Dissolve the resulting oil in benzene, treat the benzene solution with decolorizing charcoal, filter the mixture, and add n-heptane to the filtrate. Recrystallize the resulting solid from ethyl acetate and dry it at 60° C. for eighteen hours at 20 mm. to yield 9.2 g. of 2-(2-chlorophenyl)-3-[2-(2-hydroxyethylamino)ethyl]-4-thiazolidinone, M.P. 83.0–85.2° C. (corr.).

Alternatively, the above procedure can be modified by first reacting the aldehyde and β-hydroxyalkylamino-alkylamine to form the azomethine (III) and then adding the thioglycolic acid, illustrated as follows:

Reflux a solution containing 42.2 g. of 2,4-dichlorobenzaldehyde and 25.0 g. of 2-(2-hydroxyethylamino)-ethylamine in 200 ml. of benzene for ninety minutes with a continuous separator connected to the reaction vessel for removal of water. Cool the reaction mixture and to it add 25.0 g. of thioglycolic acid and reflux for eighteen hours more. Cool the reaction mixture and pour it into dilute ammonium hydroxide solution. Separate the benzene layer, wash it with water, dry it over anhydrous calcium sulfate and evaporate it to yield 67.5 g. of the product. Form its hydrochloride by dissolving 13 g. of it in hot isopropyl alcohol, acidifying the solution with ethanolic hydrogen chloride, cooling, and collecting the precipitate. Recrystallize the precipitate from ethanol using decolorizing charcoal and dry it at 55° C. for eighteen hours at 20 mm. to yield 8.2 g. of 2-(2,4-dichlorophenyl) - 3 - [2 - (2 - hydroxyethylamino)ethyl]-4-thiazolidinone hydrochloride, M.P. 178.0–180.0° C. (corr.).

B. Preparation of 4-thiazolidinone

Stir a mixture containing 10.0 g. of 2-(2-chlorophenyl)-3 - [2 - (2 - hydroxyethylamino)ethyl] - 4 - thiazolidinone and 6.3 g. of ethyl trichloroacetate on a steam bath for four hours. Remove the excess ester by evaporation and dry the remaining material at 50° C. for one hour at 0.2 mm. Dissolve the remaining oily material in hot isopropyl alcohol. Treat the resulting solution with decolorizing charcoal, filter the mixture, and cool the filtrate. Collect the solid that separates and dry it at 50° C. for eighteen hours at 20 mm. to yield 7.9 g. of 2-(2-chlorophenyl) - 3 - [2 - (2 - oxazolidinone - 3 - yl)ethyl]-4-thiazolidinone, M.P. 104.2—106.6° C. (corr.). Infrared analysis of this substance showed the characteristic C=O frequencies for both the 2-oxazolidinone and 4-thiazolidinone rings, confirming that cyclization had occurred.

C. Preparation of 4-thiazolidinone-1-oxide

Cool a solution of 8.0 g. of 2-(2-chlorophenyl)-3-[2-(2-oxazolidinone-3-yl)ethyl]-4-thiazolidinone in 75 ml. of benzene to 5° C. To this solution add dropwise with stirring a solution of 5.3 g. of 40% peracetic acid in 25 ml. of ethyl acetate, keeping the temperature below 10° C.

during the addition. Also add sufficient chloroform to dissolve any orange gummy precipitate which separates during the addition of the ethyl acetate solution. Wash the reaction mixture twice with aqueous sodium bisulfite solution and twice with water; dry it over anhydrous calcium sulfate and evaporate to yield an orange oily material. Dissolve the oil in hot isopropyl alcohol, treat the alcohol solution with decolorizing charcoal, filter the mixture, and allow the filtrate to cool slowly. Collect the precipitate that separates and dry it at 50° C. for three days at 20 mm. to yield 4.2 g. of 2-(2-chlorophenyl)-3 - [2 - (2 - oxazolidinone - 3 - yl)ethyl] - 4 - thiazolidinone-1-oxide, M.P. 132.4–135.8° C. (corr.).

D. *Preparation of 4-thiazolidinone-1,1-dioxide*

To a solution of 8.0 g. of 2-(2-chlorophenyl)-3-[2-(2-oxazolidinone-3-yl)ethyl]-4-thiazolidinone in 40 ml. of acetic acid add dropwise with stirring a solution of 8.0 g. of potassium permanganate in 80 ml. of water, keeping the reaction mixture between 20–25° C. Decolorize the reaction mixture by adding a solution of aqueous sodium bisulfite solution and stir the resulting mixture with cooling for an additional thirty minutes. Collect the resulting precipitate, recrystallize it from acetonitrile using decolorizing charcoal, and dry it at 55° C. for eighteen hours at 20 mm. to yield 5.4 g. of 2-(2-chlorophenyl)-3-[2 - (2 - oxazolidinone - 3 - yl)ethyl] - 4 - thiazolidinone-1,1-dioxide, M.P. 194.2–196.6° C. (corr.).

I have also made the composition constituting the invention with no substituent at the 2-position of the 4-thiazolidinone ring or with other substituents at said 2-position as well as the composition with modifications of the 3-substituent and have determined by pharmacological evaluation that the composition so modified possesses the inherent applied use characteristics of exerting varying pharmacological effects in animal organisms. Such additions to the molecular structure of the inventive concept herein described are, therefore, equivalents of the subject matter sought to be patented. Modification of the 2-substituent and of the 3-[(2-oxazolidinone-3-yl)-(lower alkyl)] substituent are illustrated as follows.

A. *Starting materials*

2 - (4 - chlorophenyl) - 3 - [2 - (2 - hydroxyethylamino)-ethyl]-4-thiazolidinone, M.P. 133.5–134.5° C. (corr.);

3 - [2 - (2 - hydroxyethylamino)ethyl] - 2 - (2 - methylphenyl)-4-thiazolidinone hydrochloride, M.P. 132.5–135.5° C.;

3 - [2 - (2 - hydroxyethylamino)ethyl] - 2 - (2 - methoxyphenyl)-4-thiazolidinone hydrochloride, M.P. 132.0–135.5° C. (corr.);

3 - 2 - (2 - hydroxyethylamino)ethyl] - 2 - phenyl - 4-thiazolidinone hydrochloride, M.P. 149.0–150.5° C. (corr.);

3 - [2 - (2 - hydroxyethylamino)ethyl] - 2 - (2 - thienyl)-4-thiazolidinone hydrochloride, M.P. 169.8–171.4° C.;

3 - [2 - (2 - hydroxyethylamino) - ethyl] - 2 - (4 - methoxyphenyl)-4-thiazolidinone hydrochloride, M.P. 123.0–125.5° C. (corr.);

3 - [2 - (2 - hydroxyethylamino)ethyl] - 2 - (1 - naphthyl)-4-thiazolidinone hydrochloride, M.P. 197.0–199.8° C. (corr.);

3 - [2 - (2 - hydroxyethylamino)ethyl] - 2 - (4 - isopropylphenyl)-4-thiazolidinone hydrochloride, MP. 163.8–164.8° C. (corr.);

3 - [3 - (2 - hydroxyethylamino)propyl] - 2 - phenyl - 4-thiazolidinone hydrochloride, M.P. 159.6–166.0° C. (corr.);

3 - [2 - (2 - hydroxyethylamino)ethyl] - 4 - thiazolidinone (using paraformaldehyde as the aldehyde);

2 - (3,4 - dichlorophenyl) - 3 - [2 - (2 - hydroxyethylamino)ethyl]-4-thiazolidinone.

B. *4-thiazolidinones*

2-(3,4-dichlorophenyl)-3-[2-(2-oxazolidinone-3-yl) ethyl]-4-thiazolidinone, M.P. 131.0–133.0° C. (corr.);

2-phenyl-3-[2-(2-oxazolidinone-3-yl)ethyl]-4-thiazolidinone, M.P. 82.6–86.0° C. (corr.);

2-(2-thienyl)-3-[2-(2-oxazolidinone-3-yl)ethyl]-4-thiazolidinone, M.P. 129.5–130.8° C. (corr.);

2-(4-chlorophenyl)-3-[2-(2-oxazolidinone-3-yl)-ethyl]-4-thiazolidinone, M.P. 139.0–140.0° C. (corr.);

2-(2,4-dichlorophenyl)-3-[2-(2-oxazolidinone-3-yl) ethyl]-4-thiazolidinone, M.P. 142.4–143.5° C. (corr.);

2-(2-methylphenyl)-3-[2-(2-oxazolidinone-3-yl) ethyl]-4-thiazolidinone, M.P. 121.0–122.5° C. (corr.);

2-(4-methoxyphenyl)-3-[2-(2-oxazolidinone-3-yl) ethyl]-4-thiazolidinone, M.P. 99.0–100.0° C. (corr.);

2-(2-methoxyphenyl)-3-[2-(2-oxazolidinone-3-yl) ethyl]-4-thiazolidinone, M.P. 110.0–111.2° C. (corr.);

2-(1-naphthyl)-3-[2-(2-oxazolidinone-3-yl)ethyl]-4-thiazolidinone, M.P. 113.0–115.0° C. (corr.);

2-(4-isopropylphenyl)-3-[2-(2-oxazolidinone-3-yl) ethyl]-4-thiazolidinone, M.P. 86.4–87.4° C.;

2-(4-dimethylaminophenyl)-3-[2-(2-oxazolidinone-3-yl)ethyl]-4-thiazolidinone, M.P. 150.0–151.0° C. (corr.);

3-[3-(2-oxazolidinone-3-yl)propyl]-2-phenyl-4-thiazolidinone;

3-[2-(2-oxazolidinone-3-yl)ethyl]-4-thiazolidinone, M.P. 103.0–105.0° C. (corr.).

C. *4-thiazolidinone-1-oxides*

2-(3,4-dichlorophenyl)-3-[2-(2-oxazolidinone-3-yl) ethyl]-4-thiazolidinone-1-oxide, M.P. 149.0–150.0° C. (corr.);

2-(4-chlorophenyl)-3-[2-(2-oxazolidinone-3-yl)ethyl]-4-thiazolidinone-1-oxide, M.P. 133.5–137.8° C. (corr.);

3-[2-(2-oxazolidinone-3-yl)ethyl]-2-(2-thienyl)-4-thiazolidinone-1-oxide, M.P. 163.6–165.0° C. (corr.);

2-(4-methoxyphenyl)-3-[2-(2-oxazolidinone-3-yl)ethyl]-4-thiazolidinone-1-oxide, M.P. 116.5–120.2° C. (corr.);

2-(2,4-dichlorophenyl)-3-[2-(2-oxazolidinone-3-yl) ethyl-4-thiazolidinone-1-oxide, M.P. 180.8–188.8° C. (corr.);

2-(2-methoxyphenyl)-3-[2-(2-oxazolidinone-3-yl)ethyl]-4-thiazolidinone-1-oxide, M.P. 132.0–136.5° C.;

2-(1-naphthyl)-3-[2-(2-oxazolidinone-3-yl)ethyl-4-thiazolidinone-1-oxide, M.P. 165.0–166.2° C. (corr.);

3-[3-(2-oxazolidinone-3-yl)propyl]-2-phenyl-4-thiazolidinone-1-oxide, M.P. 119.6–121.4° C. (corr.);

3-[2-(2-oxazolidinone-3-yl)ethyl]-4-thiazolidinone-1-oxide, M.P. 149.0–152.0° C. (corr.).

D. *4-thiazolidinone-1,1-dioxides*

2-(3,4-dichlorophenyl)-3-[2-(2-oxazolidinone-3-yl) ethyl]-4-thiazolidinone-1,1-dioxide, M.P. 187.2–189.4° C. (corr.);

2-(4-chlorophenyl)-3-[2-(2-oxazolidinone-3-yl)-ethyl]-4-thiazolidinone-1,1-dioxide, M.P. 169.6–171.0° C. (corr.);

3-[2-(2-oxazolidinone-3-yl)ethyl]-2-(2-thienyl)-4-thiazolidinone-1,1-dioxide, M.P. 148.5–150.2° C. (corr.);

2-(2,4-dichlorophenyl)-3-[2-(2-oxazolidinone-3-yl) ethyl]-4-thiazolidinone-1,1-dioxide, M.P. 213.4–215.6° C. (corr.) with decomposition;

2-(4-methoxyphenyl)-3-[2-(2-oxazolidinone-3-yl) ethyl]-4-thiazolidinone-1,1-dioxide, M.P. 149.0–151.0° C. (corr.);

2-(2-methylphenyl)-3-[2-(2-oxazolidinone-3-yl)ethyl]-4-thiazolidinone-1,1-dioxide, M.P. 135.0–136.0° C. (corr.);

3-[2-(2-oxazolidinone-3-yl)-ethyl]-2-phenyl-4-thiazolidinone-1,1-dioxide, M.P. 127.0–129.0° C. (corr.);

2-(2-methoxyphenyl)-3-[2-(2-oxazolidinone-3-yl) ethyl]-4-thiazolidinone-1,1-dioxide, M.P. 168.2–170.0° C. (corr.);

2-(1-naphthyl)-3-[2-(2-oxazolidinone-3-yl)ethyl]-4-thiazolidinone-1,1-dioxide, M.P. 191.2–191.4° C. (corr.) with decomposition;

3-[3-(2-oxazolidinone-3-yl)propyl]-2-phenyl-4-thiazolidinone-1,1-dioxide, M.P. 150.0–152.0° C. (corr.);
2-(4-isopropylphenyl)-3-[2-(2-oxazolidinone-3-yl)ethyl]-4-thiazolidinone-1,1-dioxide, M.P. 123.6–132.0° C. (corr.);
3-[2-(2-oxazolidinone-3-yl)ethyl]-4-thiazolidinone-1,1-dioxide.

The manner of using the invention sought to be patented will now be described.

The physical embodiments of the molecular structure concept herein described and claimed have the applied use characteristics of exerting varying pharmacological effects in animal organisms. Among the effects which have been found in various members of the group are psychomotor stimulatory activity, psychomotor depressant activity, and potentiation of barbiturate hypnotic activity, upon evaluation in accord with known test procedures for determining such effects. Which of the above-mentioned pharmacological effects inures to any particular member of the group of compounds can readily be determined by the use of known techniques.

When administered orally to mice using a modified procedure of the photocell activity cage method of Dews [Brit. J. Pharmacol. 8, 46 (1953)], embodiments were found to have psychomotor stimulatory or depressant properties at dose levels of about 10 to 300 mg./kg. of body weight. For example, the following compounds produced stimulation (30% or greater increase in activity over controls) at the given doses:

2-(2-chlorophenyl)-3-[2-(2-oxazolidinone-3-yl)ethyl]-4-thiazolidinone, 52% at 100 mg./kg. and 107% at 300 mg./kg.;
2-(3-,4-dichlorophenyl)-3-[2-(2-oxazolidinone-3-yl)ethyl]-4-thiazolidinone, 82% at 300 mg./kg.;
3-[2-(2-oxazolidinone-3-yl)ethyl]-4-thiazolidinone, 31% at 30 mg./kg.;
2-(1-naphthyl)-3-[2-(2-oxazolidinone-3-yl)ethyl]-4-thiazolidinone, 33% at 300 mg./kg.;
2-(4-chlorophenyl)-3-[2-(2-oxazolidinone-3-yl)ethyl]-4-thiazolidinone, 84% at 30 mg./kg.;
2-(2-methylphenyl)-3-[2-(2-oxazolidinone-3-yl)ethyl]-4-thiazolidinone, 34% at 30 mg./kg.;
2-(4-methoxyphenyl)-3-[2-(2-oxazolidinone-3-yl)ethyl]-4-thiazolidinone, 38% at 100 mg./kg.;
3-[2-(2-oxazolidinone-3-yl)ethyl]-2-(2-thienyl)-4-thiazolidinone-1-oxide, 55% at 30 mg./kg.;
2-(2-methoxyphenyl)-3-[2-(2-oxazolidinone-3-yl)ethyl]-4-thiazolidinone-1-oxide, 69% at 300 mg./kg.;
2-(1-naphthyl)-3-[2-(2-oxazolidinone-3-yl)ethyl]-4-thiazolidinone-1-oxide, 31% at 30 mg./kg.;
3-[3-(2-oxazolidinone-3-yl)propyl]-2-phenyl-4-thiazolidinone-1-oxide, 48% at 300 mg./kg.;
2-(3,4-dichlorophenyl)-3-[2-(2-oxazolidinone-3-yl)ethyl]-4-thiazolidinone-1,1-dioxide, 114% at 300 mg./kg.; and
2-(4-chlorophenyl)-3-[2-(2-oxazolidinone-3-yl)ethyl]-4-thiazolidinone-1,1-dioxide, 35% at 300 mg./kg.

The foregoing indicates their utility as stimulants. Using the same procedure, the following compounds were found to have psychomotor depressant properties (30% or greater decrease in activity over controls) at the indicated dose levels:

2-phenyl-3-[2-(2-oxazolidinone-3-yl)ethyl]-4-thiazolidinone, 50% at 30 mg./kg.;
2-(2-methylphenyl)-3-[2-(2-oxazolidinone-3-yl)ethyl]-4-thiazolidinone, 40% at 300 mg./kg.;
2-(4-isopropylphenyl)-3-[2-(2-oxazolidinone-3-yl)ethyl]-4-thiazolidinone, 33% at 30 mg./kg.;
2-(4-dimethylaminophenyl)-3-[2-(2-oxazolidinone-3-yl)ethyl]-4-thiazolidinone, 40% at 100 mg./kg.;
3-[2-(2-oxazolidinone-3-yl)ethyl]-4-thiazolidinone-1-oxide, 42% at 300 mg./kg.;
2-(3,4-dichlorophenyl)-3-[2-(2-oxazolidinone-3-yl)ethyl]-4-thiazolidinone-1-oxide, 57% at 300 mg./kg.;
2-(4-methoxyphenyl)-3-[2-(2-oxazolidinone-3-yl)ethyl]-4-thiazolidinone-1-oxide, 48% at 300 mg./kg.;
2-(4-chlorophenyl)-3-[2-(2-oxazolidinone-3-yl)ethyl]-4-thiazolidinone-1-oxide, 33% at 300 mg./kg.;
2-(1-naphthyl)-3-[2-(2-oxazolidinone-3-yl)ethyl]-4-thiazolidinone-1-oxide, 37% at 300 mg./kg.;
3-[2-(2-oxazolidinone-3-yl)ethyl]-2-(2-thienyl)-4-thiazolidinone-1,1-dioxide, 37% at 100 mg./kg.;
2-(4-methoxyphenyl)-3-[2-(2-oxazolidinone-3-yl)ethyl]-4-thiazolidinone-1,1-dioxide, 40% at 300 mg./kg.;
2-(2-methoxyphenyl)-3-[2-(2-oxazolidinone-3-yl)ethyl]-4-thiazolidinone-1,1-dioxide, 30% at 300 mg./kg.;
2-(1-naphthyl)-3-[2-(2-oxazolidinone-3-yl)ethyl]-4-thiazolidinone-1,1-dioxide, 42% at 100 mg./kg.;
3-[3-(2-oxazolidinone-3-yl)propyl]-2-phenyl-4-thiazolidinone-1,1-dioxide, 35% at 300 mg./kg.; and
2-(2-chlorophenyl)-3-[2-(2-oxazolidinone-3-yl)ethyl]-4-thiazolidinone-1,1-dioxide, 57% at 300 mg./kg.

The foregoing indicates their utility as depressants.

Compounds found to exhibit some potentiation of hexobarbital sodium hypnotic activity in mice at 300 mg./kg. administered intraperitoneally forty or ninety minutes before the intraperitoneal administration of 40 mg./kg. of hexobarbital sodium are:

2-(4-chlorophenyl)-3-[2-(2-oxazolidinone-3-yl)ethyl]-4-thiazolidinone,
2-(4-dimethylaminophenyl)-3-[2-(2-oxazolidinone-3-yl)-ethyl]-4-thiazolidinone,
3-[2-(2-oxazolidinone-3-yl)ethyl]-4-thiazolidinone,
3-[3-(2-oxazolidinone-3-yl)propyl]-2-phenyl-4-thiazolidinone-1-oxide,
3-[2-(2-oxazolidinone-3-yl)ethyl]-2-phenyl-4-thiazolidinone-1,1-dioxide,
3-[2-(2-oxazolidinone-3-yl)ethyl]-2-(2-thienyl)-4-thiazolidinone-1,1-dioxide,
2-(4-chlorophenyl)-3-[2-(2-oxazolidinone-3-yl)ethyl]-4-thiazolidinone-1,1-dioxide,
2-(2-methylphenyl)-3-[2-(2-oxazolidinone-3-yl)ethyl]-4-thiazolidinone-1,1-dioxide, and
3-[3-(2-oxazolidinone-3-yl)propyl]-2-phenyl-4-thiazolidinone-1,1-dioxide.

The foregoing indicates their utility as potentiators of barbiturate hypnotic activity.

The subject matter which the applicant regards as his invention is particularly pointed out and distinctly claimed as follows:

1. A composition of a molecular structure in which 4-thiazolidinone is connected, by its ring-nitrogen atom, through polycarbon-(lower-alkylene) having its connecting linkages on different carbon atoms, to the ring-nitrogen atom of 2-oxazolidinone.

2. The 1-oxide derivative of the composition of claim 1.

3. The 1,1-dioxide derivative of the composition of claim 1.

4. 2-(2-chlorophenyl)-3-[2-(2-oxazolidinone - 3 - yl)ethyl]-4-thiazolidinone.

5. 2-(3,4-dichlorophenyl)-3-[2-(2 - oxazolidinone - 3-yl)ethyl]-4-thiazolidinone.

6. 2-(3-,4-dichlorophenyl)-3-[2-(2 - oxazolidinone - 3-yl)ethyl]-4-thiazolidinone-1-oxide.

7. 2-(3,4-dichlorophenyl)-3-[2-(2 - oxazolidinone - 3-yl)ethyl]-4-thiazolidinone-1,1-dioxide.

8. 3-[2-(2-oxazolidinone-3-yl)ethyl] - 2 - (2-thienyl)-4-thiazolidinone.

9. 2-(2-methoxyphenyl)-3-[2-(2-oxazolidinone - 3 - yl)ethyl]-4-thiazolidinone-1-oxide.

10. 2-(1-naphthyl) - 3 - [2 - (2 - oxazolidinone - 3 - yl)ethyl]-4-thiazolidinone.

11. 3-[3-(2-oxazolidinone-3-yl)-propyl] - 2 - phenyl - 4-azolidinone-1,1-dioxide.

12. 3-[2-(2-oxazolidinone-3-yl)ethyl]-4-thiazolidinone.

13. 3-[2-(2-oxazolidinone-3-yl)ethyl] - 4 - thiazolidinone-1-oxide.

14. The process of preparing a composition of a molecular structure in which 4-thiazolidinone is connected, by its ring-nitrogen atom, through polycarbon-(lower-alkylene) having its connecting linkages on different carbon atoms, to the ring-nitrogen atom of 2-oxazolidinone, which comprises reacting the corresponding 3-[(β-hydroxy-lower-alkylamino)-(polycarbon-lower-alkyl)] - 4-thiazolidinone with a compound selected from the group consisting of an ester of trichloroacetic acid or a trichloroacetyl halide.

15. The process of preparing a composition of a molecular structure in which 4-thiazolidinone is connected, by its ring-nitrogen atom, through polycarbon-(lower-alkylene) having its connecting linkages on different carbon atoms, to the ring-nitrogen atom of 2-oxazolidinone, which comprises reacting the corresponding 3-[(β-hydroxy-lower-alkylamino)-(polycarbon - lower-alkyl)] - 4-thiazolidinone with a lower-alkyl trichloroacetate.

No references cited.

ALEX MAZEL, *Primary Examiner.*

ALTON D. ROLLINS, *Examiner.*

UNITED STATES PATENT OFFICE
CERTIFICATE OF CORRECTION

Patent No. 3,309,377                          March 14, 1967

Alexander R. Surrey

It is hereby certified that error appears in the above numbered patent requiring correction and that the said Letters Patent should read as corrected below.

Column 1, line 11, for "compositions" read -- compositions. --; column 2, line 44, after the last formula insert -- VI --; column 5, line 47, for "135.5° C." read -- 133.5° C. --; line 51, for "3-2" read -- 3-[2 --; column 6, lines 38 and 42, for "ethyl-4", each occurrence, read -- ethyl]-4 --; column 7, line 34, and column 8, line 61, for "(3-", each occurrence, read -- (3 --; column 8, line 72, for "azolidinone" read -- thiazolidinone --.

Signed and sealed this 14th day of November 1967.

(SEAL)

Attest:

Edward M. Fletcher, Jr.

Attesting Officer

EDWARD J. BRENNER

Commissioner of Patents